Figure 1:
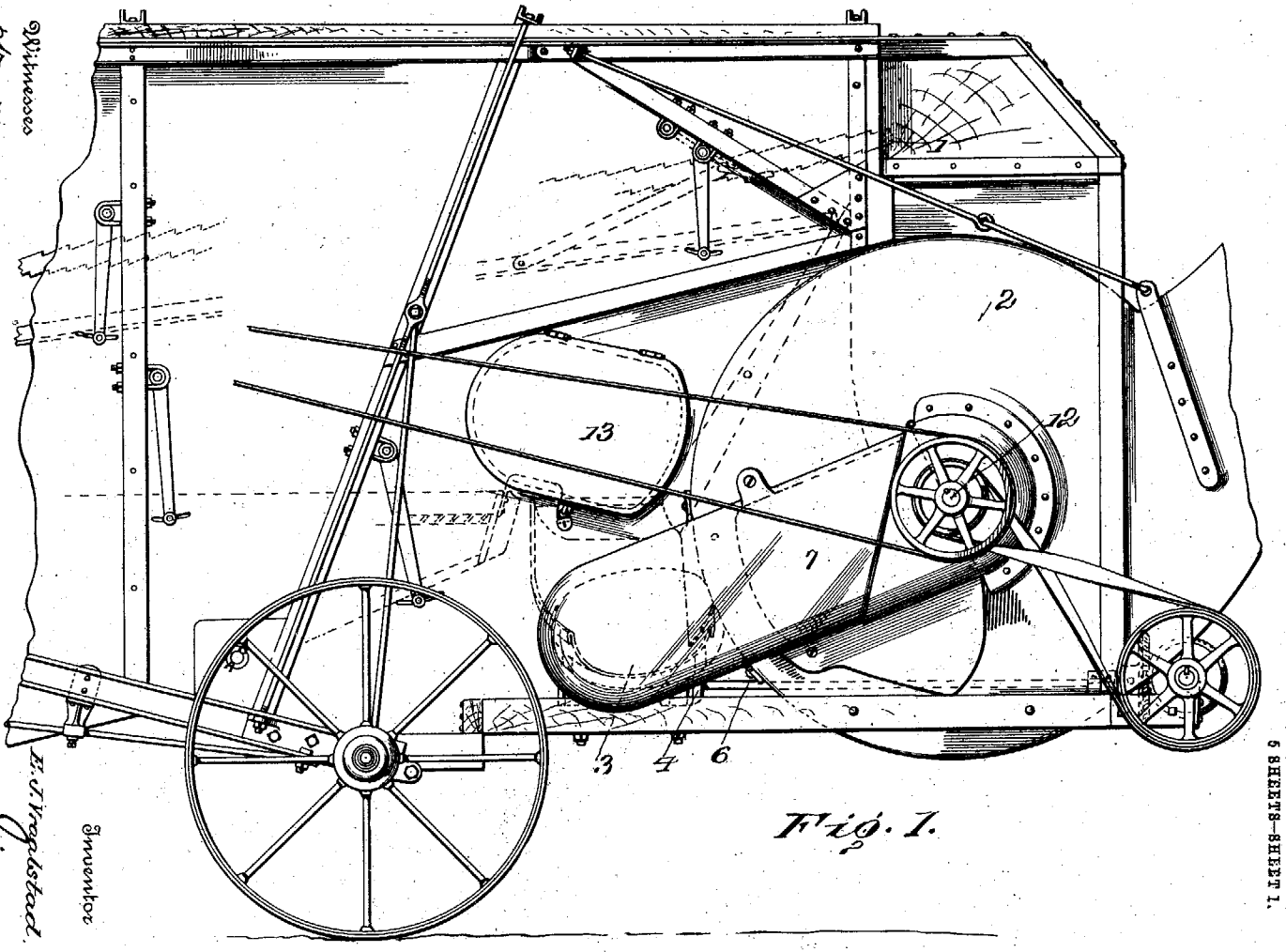

E. J. VRAALSTAD.

SEPARATOR AND STACKER.

APPLICATION FILED MAY 5, 1910.

Reissued Oct. 11, 1910.

13,156.

5 SHEETS—SHEET 1.

Witnesses

W. A. Williams

Francis S. Magnus

Inventor

E. J. Vraalstad.

By

Attorney

THE NORRIS PETERS CO., WASHINGTON, D. C.

E. J. VRAALSTAD.

SEPARATOR AND STACKER.

APPLICATION FILED MAY 5, 1910.

Reissued Oct. 11, 1910.

13,156.

5 SHEETS—SHEET 2.

Witnesses

W. A. Williams

Francis S. Magnin

Inventor

E. J. Vraalstad.

By

Attorney

THE NORRIS PETERS CO., WASHINGTON, D. C.

E. J. VRAALSTAD.

SEPARATOR AND STACKER.

APPLICATION FILED MAY 5, 1910.

Reissued Oct. 11, 1910.

13,156.

5 SHEETS—SHEET 3.

Witnesses

W. A. Williams.

Francis S. Magnin

By

E. J. Vraalstad.

Attorney

Inventor

THE NORRIS PETERS CO., WASHINGTON, D. C.

E. J. VRAALSTAD.

SEPARATOR AND STACKER.

APPLICATION FILED MAY 5, 1910.

Reissued Oct. 11, 1910.

13,156.

5 SHEETS—SHEET 4.

Witnesses

W. A. Williams.

Francis S. Chapman

Inventor

E. J. Vraalstad.

By

Attorney

THE NORRIS PETERS CO., WASHINGTON, D.C.

E. J. VRAALSTAD.

SEPARATOR AND STACKER.

APPLICATION FILED MAY 5, 1910.

Reissued Oct. 11, 1910.

13,156.

5 SHEETS—SHEET 5.

Witnesses

W. A. Williams.

Francis S. Chapman

Inventor

E. J. Vraalstad.

By

Attorney

THE NORRIS PETERS CO., WASHINGTON, D. C.

UNITED STATES PATENT OFFICE.

EDWARD J. VRAALSTAD, OF BUFFALO, NEW YORK, ASSIGNOR OF ONE-HALF TO BUFFALO PITTS COMPANY, OF BUFFALO, NEW YORK, A CORPORATION OF NEW YORK.

SEPARATOR AND STACKER.

13,156. Specification of Reissued Letters Patent. Reissued Oct. 11, 1910.

Original No. 954,365, dated April 5, 1910, Serial No. 433,135. Application for reissue filed May 5, 1910. Serial No. 559,648.

*To all whom it may concern:*

Be it known that I, EDWARD J. VRAALSTAD, of Buffalo, in the county of Erie and State of New York, have invented certain new and useful Improvements in Separators and Stackers; and I do hereby declare the following to be a full, clear, and exact description of the invention, such as will enable others skilled in the art to which it appertains to make and use the same.

In the use of threshing machines or separators having means at the discharge end for discharging, by pneumatic pressure, the straw, chaff, etc., difficulty has been experienced because of the constant presence of a plenum within the machine created by the fans employed in separating and cleaning the grain. The straw-discharging fan being incapable of overcoming the plenum, dust and other foreign particles are forced out through various openings and crevices of the machine.

The object of my invention is to so construct and arrange the parts as to practically destroy the plenum within the machine, and at the same time avoid increased friction between the fan and the straw.

A further object is to provide in a separator and stacker means whereby the chaff may be discharged separately from the straw, or in conjunction therewith, but in either event maintain the advantage last recited.

In attaining these ends I am enabled to so construct and arrange the parts as to prevent the chopping or breaking up of the straw; and also to so position the fan casing, in a thresher having the discharge points of the straw sieve and chaff shoe some distance apart longitudinally of the machine, that it will have the necessary clearance above the ground to permit the machine to be freely moved from place to place without danger of the fan casing striking obstacles in the road, that is to say, the fan casing may be located at a relatively high point and still receive the discharge of both the straw and chaff.

The invention will be hereinafter fully set forth and particularly pointed out in the claims.

Figure 2:
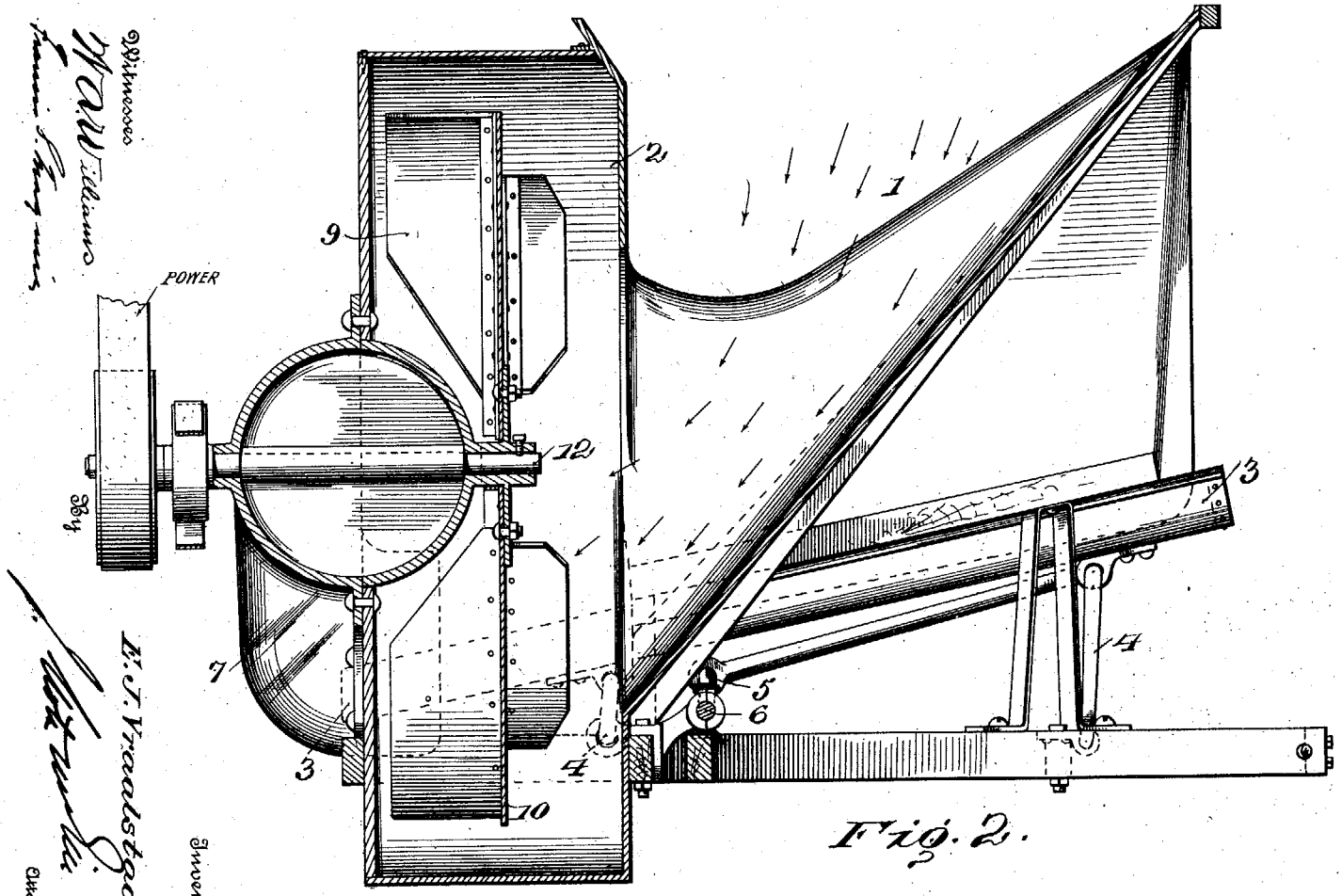
Figure 3:
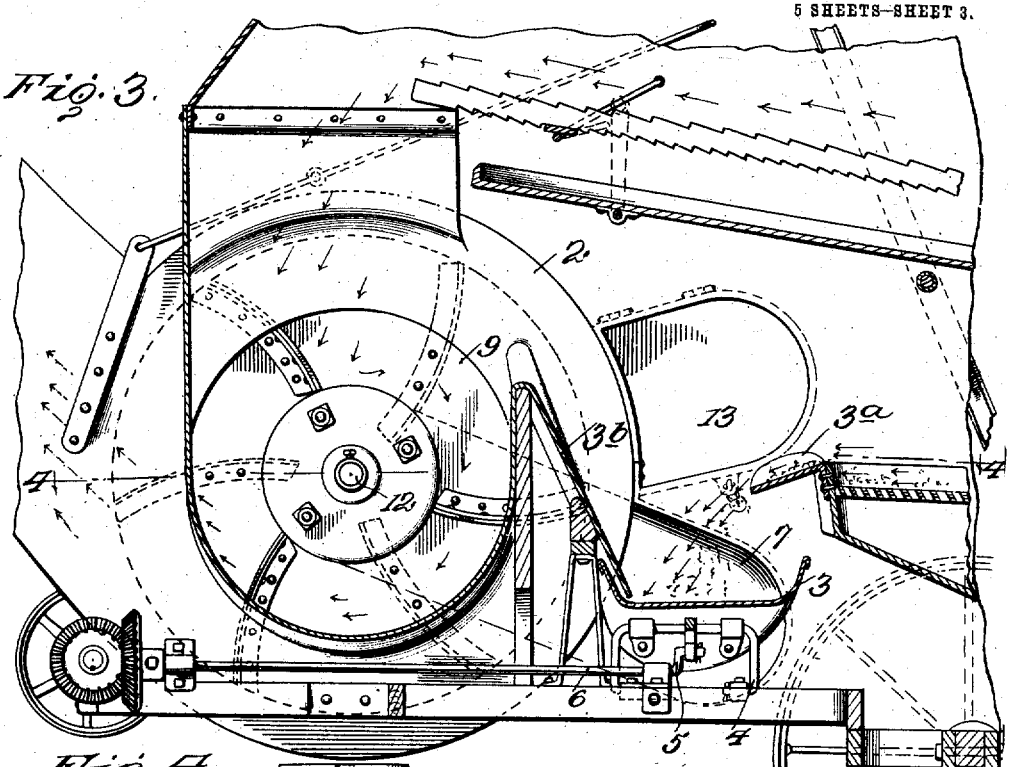
Figure 4:
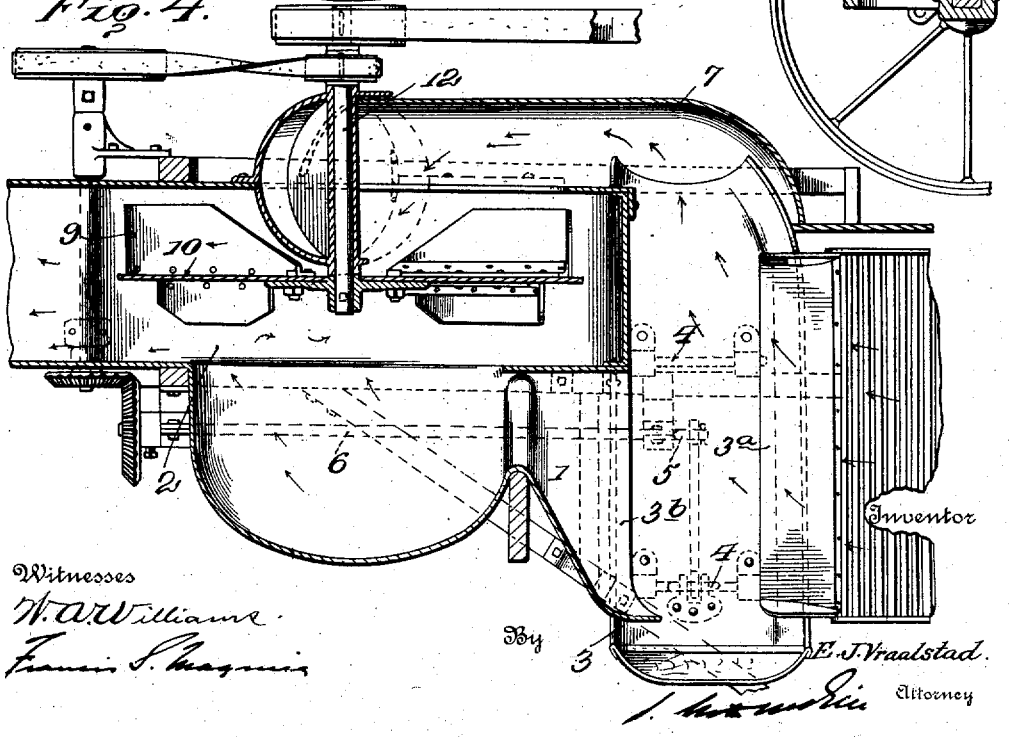
Figure 5:
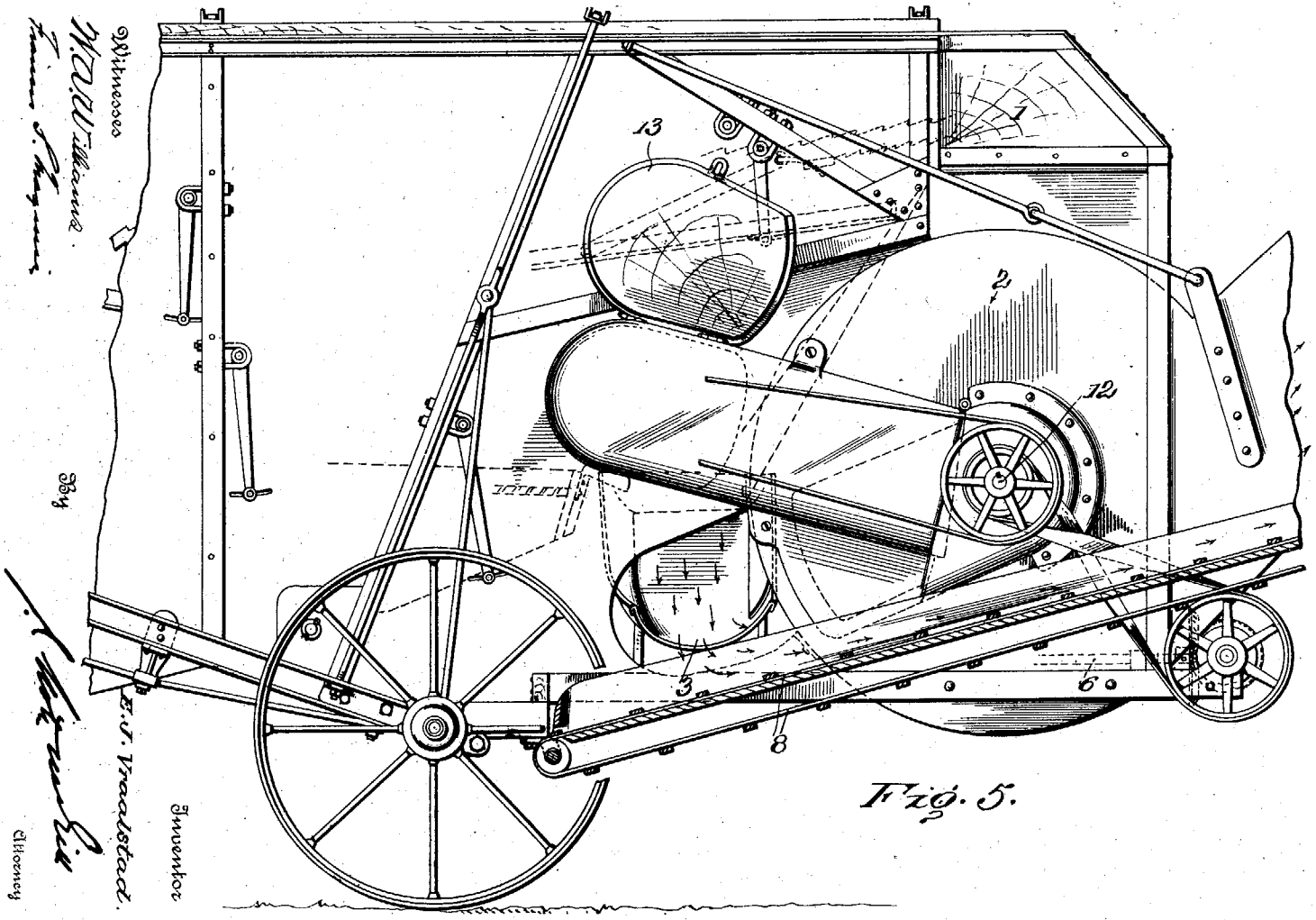
Figure 6:
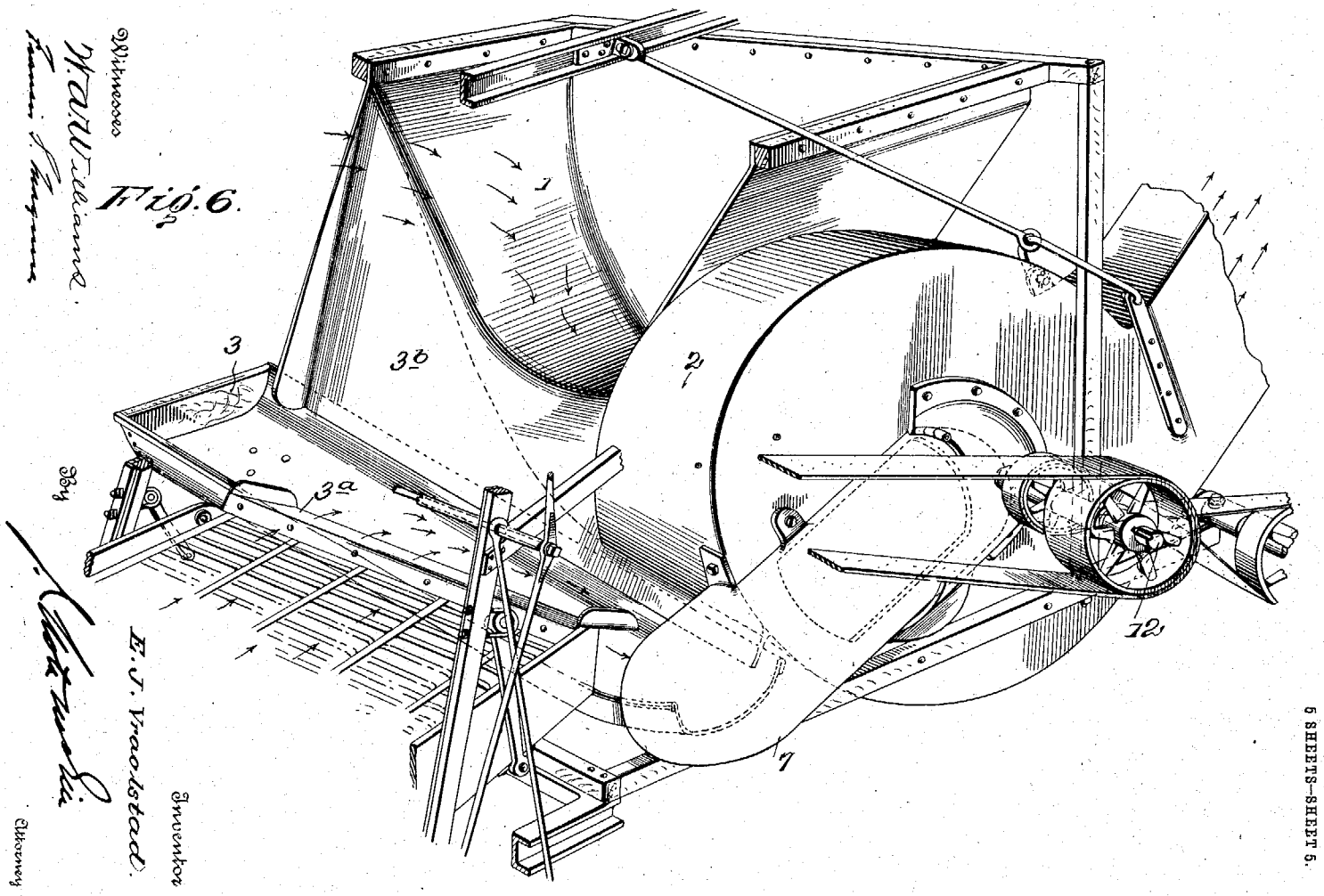

In the accompanying drawings, Figure 1 is a side elevation of a portion of a threshing machine, equipped with my improvements. Fig. 2 is an enlarged transverse sectional view through the fan, its casing, and the straw chamber. Fig. 3 is a sectional view through the delivery end of the straw chamber looking toward the fan. Fig. 4 is a horizontal sectional view on line 4—4, Fig. 3. Fig. 5 is a view similar to Fig. 1, but with the chute or off-take in a different position. Fig. 6 is an enlarged view in perspective.

Referring to the drawings, 1 designates the straw-chamber of a separator; and 2 a fan casing located at one side of the straw-chamber and extended longitudinally of the machine, said casing having an opening through its inner wall into the straw-chamber.

3 designates a chaff receiving pan into which a portion, if not all, of the chaff and short straw are discharged, being directed thereinto by a trough formed by opposite inclined walls $3^a$ and $3^b$. Of course, some of the chaff will fall over into the straw chamber 1, the wall $3^b$ of the trough not being capable of intercepting all the chaff in the air currents. The pan is set on an incline transversely of the separator, and is shown as mounted on crank bearings 4. It is designed to be vibrated longitudinally by the rotation of a crank 5 connected to the bottom thereof, such crank being operated by a shaft 6 driven by any suitable means.

It will noted that the point of discharge or entrance of the long straw into chamber 1, is some distance in rear of the discharge or entrance of the chaff and short straw into the trough of pan 3.

7 designates a chute or off-take which is hinged or otherwise pivotally mounted on the outer wall of fan casing 2, concentrically thereof, and which is designed to occupy either of two positions. When in its lower position it receives the chaff from the vibrating pan 3 and allows it to pass into the fan-casing through an opening in the outer wall thereof. When this chute or off-take is in its raised position its free end is projected into the machine or fits over an opening in the side thereof, so as to still maintain communication between the interior of the separator and the fan-casing. Under this condition the chaff is discharged from the vibrating pan either direct onto the ground or onto a conveyer 8. (See Fig. 5.)

9 designates a duplex fan located within the fan-casing. I have referred to this as a "duplex" fan for that it embodies two sets of fan blades on opposite sides of a dividing disk 10, all mounted on a common shaft 12. The inner blades, opposite the opening into the straw-chamber, constitute in themselves the straw-handling fan, and are made narrower than the outer blades facing the opening into the outer wall, which blades without engaging the straw, aid in ejecting it through the discharge tube. By making the straw engaging blades narrow, and having them occupy but a portion of the width of the straw-receiving section of the fan-casing, chopping or breaking up of the straw is avoided, and such narrow blades mechanically eject the straw into the discharge duct through which it is pneumatically propelled by the outer series of blades. What is lost in power by thus narrowing the blades on the inner side of the disk is more than off-set by the heavy blast produced by the wide blades on the outer side of the disk. When the chute or off-take occupies its lowered position this outer fan in discharging the chaff aids in ejecting the straw, and cooperates with the inner fan in reducing the air pressure in the machine. When the chute is raised this outer or larger fan while continuing to reduce the air pressure within the separator will assist the straw-handling fan in ejecting the straw but without mingling the chaff therewith. Thus I am enabled to off-set the plenum within the separator without in any way increasing the friction between the straw and its discharging fan. Whether or not the second fan of wide blades be employed for discharging the chaff, or solely for aiding in reducing the air pressure in the separator, it also cooperates with the straw-handling fan in discharging the straw through the tube.

The opening into which the end of the chute projects, or with which it coincides, when in its raised position, is closed by a door 13 when the chute is lowered to receive the chaff from the vibrating pan. But as to this, as well as to other details, my invention is not restricted, since it is obvious that changes may be made without departing from the scope thereof.

My present invention has been shown and described in connection with a thresher of the type wherein the point of discharge of the long straw is considerably in rear of the point of discharge of the chaff and short straw. To so place the fan casing as to directly receive, in one side, the long straw together with the chaff and short straw, would require the fan casing to be placed so low in the frame of the machine as to be liable to engage ordinary obstructions in the road. But by locating the fan casing longitudinally of the machine, and having the chamber for the long straw communicate directly through the inner side thereof, while the chaff and short straw are conveyed to the outer side of the casing through the chute 7, I am enabled to position the fan casing on a higher level than would be possible if all the material were discharged into one side of such casing, and at the same time maintain the advantage of reducing the air pressure in the machine and enable the stacker to be operated with less lower, or, at least, without any additional power. The suction action of the outer fan tends to keep down the dust by drawing it toward the pan and outwardly with the chaff and short straw.

I claim as my invention:—

1. In a separator and stacker having a straw-chamber, a fan casing paralleling the side of the separator and into the inner side of which said straw-chamber opens, a shiftable chute or off-take opening into the opposite side of said fan casing, and ejecting means within the latter.

2. In a separator and stacker having a straw-chamber, a fan casing into the inner side of which said straw-chamber opens, an adjustable chute opening into said fan casing on the side thereof opposite to the straw-chamber opening, and a duplex fan within said fan casing for ejecting the straw and chaff.

3. In a separator and stacker having a straw-chamber, a chaff-outlet, a fan-casing into which said straw-chamber opens, a fan in said casing for ejecting the straw, an adjustable chute, and a second fan in said casing, said chute or off-take opening into said fan-casing adjacent to said second fan.

4. In a separator and stacker having a straw-chamber, and a chaff-outlet, a fan casing having inner and outer openings, said inner opening forming a communication with the straw-chamber, a duplex fan on a common shaft within said fan-casing, a divider between said fans, and an adjustable chute or off-take, one of said fans serving wholly for ejecting the straw and of less capacity than the other fan.

5. A separator and stacker having a straw-chamber, a chaff-outlet at one side of the machine, a fan-casing arranged longitudinally of the machine and communicating at its inner side directly with said straw-chamber, means at the outside of the machine for conveying material from said chaff-outlet to the outer side of said fan-casing, a discharge duct leading from said fan-casing, and a fan in said casing for ejecting the straw and chaff through said fan-casing and into said duct.

6. In a separator and stacker having a straw-chamber, a chaff-outlet, the former being located in rear of the latter, a fan-casing arranged longitudinally of the machine and having at one side an opening into the straw-chamber, a chute connecting the other side of said fan casing with the forwardly located chaff outlet, a discharge duct leading from said fan-casing, and a fan within said casing having separate series of blades for ejecting straw and chaff, respectively, into said duct, and a disk separating said series of blades from each other.

7. In a separator and stacker having a straw-chamber, a chaff outlet, the former being located in rear of the latter, a fan-casing arranged longitudinally of the machine at one side of the straw-chamber and having at its inner side an opening into the latter, a chute connecting the outer side of said fan-casing, at the side of the machine, with the forwardly located chaff-outlet, a discharge duct leading from said fan-casing, and a fan within said casing having separate series of blades for ejecting straw and chaff, respectively, into said duct, and a disk separating said series of blades from each other.

8. In combination with a thresher, a separator and stacker having a straw-chamber, a fan casing communicating at its inner side directly with said straw-chamber, and having an air-inlet in its outer side, a discharge duct leading from said fan-casing, a fan within said casing having a series of blades for ejecting the straw from said chamber into said duct, a series of blades in the air-inlet side of the casing for pneumatically forcing the straw through said duct, and a disk separating said two series of blades and dividing the casing into two sections, said duct leading from both of said sections.

9. In combination with a thresher, a separator and stacker having a straw-chamber, a fan-casing communicating at its inner side directly with said straw-chamber, and having an air-inlet in its outer side communicating with the interior of the thresher at a point forward of the straw-chamber, a discharge duct leading from said fan-casing, a fan within said casing having a series of blades for ejecting the straw from said chamber into said duct, a series of blades in the air-inlet side of the casing for pneumatically forcing the straw through said duct, and a disk separating said two series of blades and dividing the casing into two sections, both of which are in direct communication with said duct.

10. In a separator and stacker having a straw-chamber, a chaff-outlet, the former being located in rear of the latter, a fan-casing arranged longitudinally of the machine and having at its inner side an opening into the straw-chamber, a chute connecting the outer side of said fan-casing, at the side of the machine, with the forwardly located chaff-outlet, a discharge duct leading from said fan-casing, and a fan within said casing comprising a disk arranged longitudinally of the machine and having on its inner side a series of narrow blades for handling the straw from the straw-chamber, and on its outer side a series of wider blades for handling the material from the chaff-outlet, said wider blades pneumatically ejecting the straw through said discharge duct without contacting therewith.

In testimony whereof I have signed this specification in the presence of two subscribing witnesses.

EDWARD J. VRAALSTAD.

Witnesses:
H. P. Seipp,
William H. Tornow.